J. D. WELLS.
Seed Planter.
No. 64,390.
Patented Apr. 30, 1867.
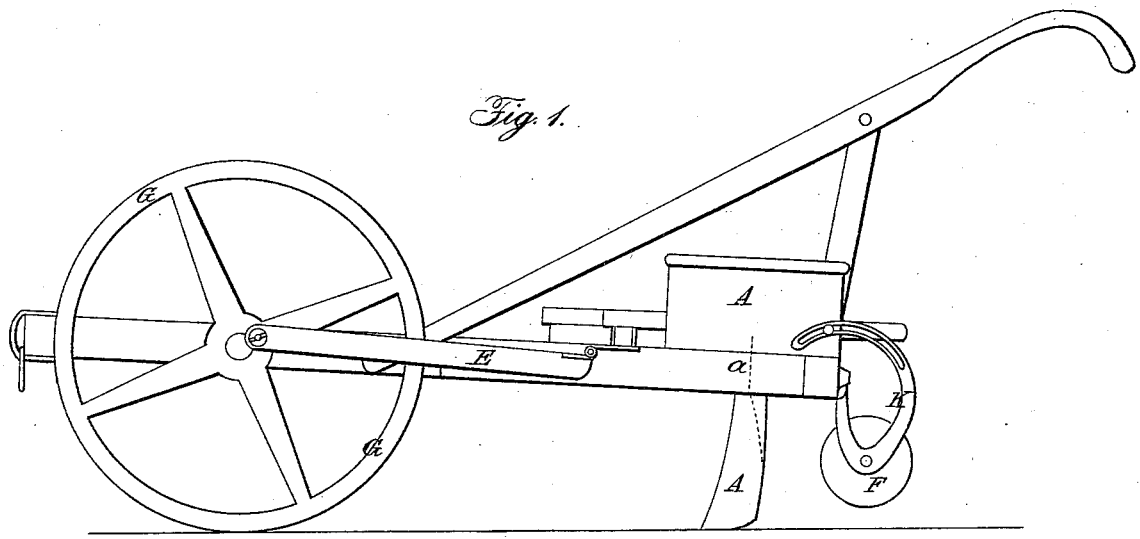
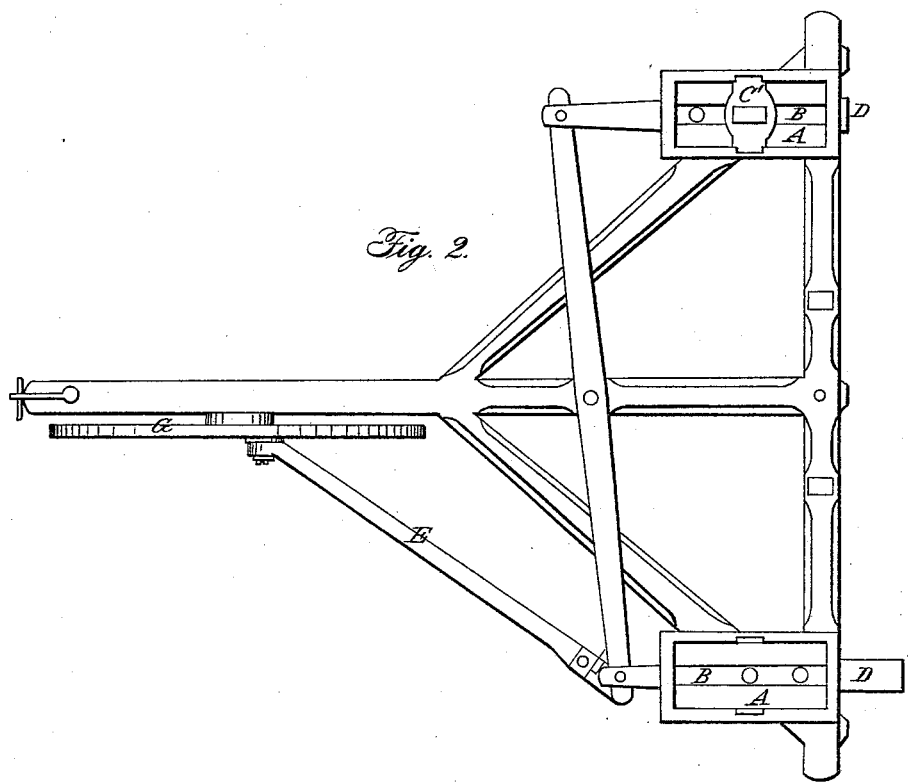
Witnesses:
R. K. Evans
Jno. D. Patten
Inventor:
John D. Wells
by A. H. Evans
Atty

United States Patent Office.

JOHN D. WELLS, OF FRANKLIN COUNTY, OHIO.

Letters Patent No. 64,390, dated April 30, 1867.

IMPROVEMENT IN CORN-PLANTERS.

*The Schedule referred to in these Letters Patent and making part of the same.*

TO ALL WHOM IT MAY CONCERN:

Be it known that I, JOHN D. WELLS, a citizen of the county of Franklin, and State of Ohio, have invented a new and improved "Corn-Planter;" and I do hereby declare that the following is a full and exact description thereof, reference being had to the accompanying drawings, and to the letters of reference marked thereon.

The nature of my invention consists in providing a single or double dropper which is opened or closed by means of a connecting-rod attached to a slide at one end, and at the other to a crank on a driving-wheel, and at the same time working a plough to open the ground, with a roller attached for covering the corn and mashing the clods.

To enable others skilled in the art to make and use my invention, I will proceed to describe its construction and operation.

Figure 1 is intended to show a side elevation of a single corn-dropper.

Figure 2 shows a plain view of a double dropper without the rollers and handles, which are to be used the same as in the single dropper.

Letters of reference show the corresponding parts in the two figures.

Letter A represents the grain-box or hopper; B shows the valve-opening with holes in it for measuring and dropping the grain; C shows the scraper or covering for the valve-openings; D the sliding piece which is attached to the valve back of the grain-boxes; E is the connecting-rod attached to the slide at one end, at the other to the crank on the driving-wheel G; H shows the plough for separating the ground to admit of the grain; and J is the roller for covering and mashing the clods, the roller being carried in a frame, K, so arranged that it can be raised or lowered as desired, as is shown in fig. 1. The double dropper has two of these rollers and two handles, the same as the common plough.

The operation of the machine is simple: As the dropper is drawn along the driving-wheel G revolves, and by means of the crank and connecting-rod and sliding pieces on the sides of the grain-boxes attached to the valves, these pieces are given a reciprocating movement. The grain fills the holes shown in the valves in fig. 2, and passes under the scraper C or valve cover, and when it gets directly over the opening shown by the dotted line $a$ in fig. 1, the grain drops to the furrow made by the plough H, which is then covered by the passing of the roller over it.

What I claim as my invention, and desire to secure by Letters Patent, is—

The application of a driving-wheel with a crank attached for operating the valves, together with the arrangement and particular combination of the several parts named, as above described, or substantially the same, which would answer the intended purpose.

JOHN D. WELLS.

Witnesses:
JOHN V. DELLICKER,
THOMAS E. TAYLOR.